US008731242B2

(12) United States Patent
Vogelmann (10) Patent No.: US 8,731,242 B2
(45) Date of Patent: May 20, 2014

(54) IMAGE ANALYSIS FOR DISPOSAL OF EXPLOSIVE ORDINANCE AND SAFETY INSPECTIONS

(75) Inventor: Dietmar Vogelmann, Reichertshofen (DE)

(73) Assignee: EADS Deutschland GmbH, Ottobrunn (DE)

( * ) Notice: Subject to any disclaimer, the term of this patent is extended or adjusted under 35 U.S.C. 154(b) by 80 days.

(21) Appl. No.: 13/471,987

(22) Filed: May 15, 2012

(65) Prior Publication Data

US 2012/0294483 A1 Nov. 22, 2012

(30) Foreign Application Priority Data

May 16, 2011 (DE) .................. 20 2011 100 744 U
Sep. 7, 2011 (DE) ...................... 10 2011 112 652

(51) Int. Cl.
*G06K 9/00* (2006.01)
(52) U.S. Cl.
USPC ....................................... 382/103

(58) Field of Classification Search
None
See application file for complete search history.

(56) References Cited

U.S. PATENT DOCUMENTS

2012/0195465 A1* 8/2012 Hughes .................. 382/103
2012/0236990 A1* 9/2012 Rothschild ............... 378/57

FOREIGN PATENT DOCUMENTS

WO WO 2010050952 A1 * 5/2010 ............. G06K 9/00

* cited by examiner

*Primary Examiner* — Nirav G Patel
(74) *Attorney, Agent, or Firm* — Crowell & Moring LLP (57) ABSTRACT

Hazardous objects in the field of explosives ordnance disposal or safety controls are identified using a sensor and image data generating arrangement and a comparison unit. The sensor and image data generating arrangement examines the object and produces an image thereof, which is compared by the comparison unit to known stored reference images. These reference images are digital images of reference objects. In this manner safety controls and explosives ordnance disposals can be organized safely and efficiently.

12 Claims, 7 Drawing Sheets

IMAGE ANALYSIS FOR DISPOSAL OF EXPLOSIVE ORDINANCE AND SAFETY INSPECTIONS

CROSS-REFERENCE TO RELATED APPLICATIONS

This application claims priority under 35 U.S.C. §119 to German Application No. 20 2011 100 744.1, filed May 16, 2011, and German Application No. 10 2011 112 652.3, filed Sep. 7, 2011, the entire disclosures of which are herein expressly incorporated by reference.

FIELD OF THE INVENTION

The invention relates to the technical field of disposal of explosive ordinance and safety inspections. The invention relates in particular to a test device for identifying hazardous objects in the area of disposal of explosive ordinance and/or safety inspections, a corresponding investigation method, a computer-readable medium and a program element.

TECHNOLOGICAL BACKGROUND

As a rule, people performing safety inspections using an x-ray apparatus have very little time to assess the object being x-rayed and its contents. This pertains in particular to airports and tourist attractions, where objects that are conventional in the majority of cases must be assessed and a conclusion must be reached as to whether these objects have been modified and whether or not they contain any hazardous products or substances. This evaluation is usually based on personal experience and the individual's own assessment.

SUMMARY OF THE INVENTION

Exemplary embodiments of the present invention are directed to safety inspections and the disposal of explosive ordinance that are safer and more reliable.

The exemplary embodiments described below pertain equally to the inspection device, the program element, the computer-readable medium and the method. In other words, features which are described below with regard to the inspection device are also implemented as corresponding process steps in the method. Furthermore, it is also possible that all of the process steps mentioned may also be performed by the inspection device optionally in combination with a human operator.

According to a first aspect of the invention, an inspection device is provided for identification of hazardous objects in the field of disposal of explosive ordinance and/or in safety inspections. The inspection device has a sensor and image data generating arrangement for inspecting the hazardous object and for generating an image of the object. In addition, a comparator unit, compares the image with stored reference images that are already known such that the reference images are digital images of reference objects.

These reference images may be stored outside of the inspection device or on a memory mechanism of the inspection device. For example, the inspection device may be linked to a central database, where the digital images of the reference objects are stored. The data connection may be accomplished here by wireless and/or cable connection, depending on the embodiment.

The inspection device can be implemented in multiple parts and can have a hardwired or wireless interface between individual units of the inspection device.

For example, the sensor and image data generating arrangement may be arranged at a definite distance from the comparator unit. This may serve to protect the operator.

The sensor and image data generating arrangement is thus an arrangement that executes an imaging method. For example, this may be an x-ray system for generating an x-ray image, an ultrasonic system for generating an ultrasonic image, a magnetic resonance system for generating an MR image and/or a positron emission tomography system for generating a PET image of the object.

In addition, video recordings of the object may also be produced and then transmitted together with the other image data to the comparator unit.

The comparator unit may also be implemented for automatic, partially automatic and/or manual creation of a virtual circuit to represent the function of a possible explosive material in the object. In addition, the comparator unit may also be implemented for automatically checking on the virtual circuit.

For example, the user may generate a virtual circuit on the basis of an image of the object with the help of a corresponding input and operating device of the comparator unit (this may be, for example, a separate laptop, a portable operating unit or an operating console of the comparator unit). This circuit generation may be supported by the comparator unit, for example, by stipulating certain circuit components that must then be combined.

Furthermore, according to another embodiment of the invention, the circuit may also be generated automatically.

After creating the virtual circuit, the comparator unit then automatically checks on whether the virtual circuit thereby created is functional. This can greatly facilitate work for the bomb disposal crew.

According to another aspect of the invention, the comparator unit is embodied for manually setting a filter function to simplify a selection of a reference image from a data record comprising many different reference images.

The user can automatically set the corresponding filter (filter function), taking into account certain product categories, for example. The identification of the object or objects (hair dryer, radio, cell phone, explosive, etc.) contained in the object can be simplified in this way.

According to another aspect of the invention, the inspection device can identify explosives and flammable materials contained in the object.

For example, the inspection device may be a mobile device for field use.

According to another aspect of the present invention, the sensor arrangement is configured to create an x-ray image, an ultrasound image, an MR image and a PET image of the object.

According to another aspect of the invention, the inspection device also has a mobile robot unit which carries the sensor and image data generating arrangement.

This mobile robot unit may be used in the field of disposal of explosive ordinance.

According to another aspect of the invention the inspection device is a safety inspection device for baggage items, freight or postal shipments for example. Such safety inspection devices are in use in airports and other enveloping facilities.

According to another aspect of the invention the inspection device is a personal inspection device, for example, in the form of a whole body scanning device.

In this case, the inspection method may be based on x-rays or on the so-called tetrahertz method. These two inspection methods are known in the field of so-called body scanners.

According to another aspect of the invention, the inspection device is embodied for automatically performing the comparison and for classifying the object on the basic of the comparison.

Therefore, no interaction with a user is necessary. It may also happen that the inspection device makes a preselection and the user verifies the accuracy of this preselection.

According to another aspect of the invention, a method for identifying hazardous objects in the field of disposal of explosive ordinance and/or its security checks is provided. First, there is an inspection of the object, whereupon an image of the object is created. This image is an x-ray, for example, or any of the other images mentioned above.

Then a reference image is selected from a plurality of reference images, wherein the reference images are digital images of reference objects.

Through a subsequent comparison of the reference image with the image of the object it is possible to ascertain whether the object is a hazardous object.

In addition, creation of a virtual circuit may be implemented automatically, partially automatically or manually to represent the function of a possible explosive charge present in the object. Next an automatic check of the virtual circuit may be performed.

A manual adjustment of a filter function may also be performed to simplify a selection of one reference image from a data record comprising a plurality of different reference images.

According to another aspect, the comparison may be performed automatically and the object may be classified on the basis of this comparison.

According to another aspect of the invention, a program element is provided, such that when this program element is executed on a processor of an inspection device as described above and below, it instructs the inspection device to first perform some or all of the process steps described above and below.

According to another aspect of the invention, a non-transitory computer-readable medium on which a corresponding program element is stored is provided, such that this program element instructs the inspection device to perform at least some of the process steps described above and below when this program element is executed on a processor of the inspection device (as described above and below).

The program element may be a computer program or part of software installed on a processor of an inspection device. The processor may also be the subject matter of the invention. In addition, this embodiment comprises a program element which, through an update, prompts an existing program to use the invention.

Exemplary embodiments of the invention are described below with reference to the figures.

DETAILED DESCRIPTION OF EXEMPLARY EMBODIMENTS

The diagrams in the figures are schematic and are not drawn to scale.

When the same reference numerals are used in different figures in the following description of the figures, they denote the same or similar elements. However, the same or similar elements may also be labeled with different reference numerals.

Figure 1:
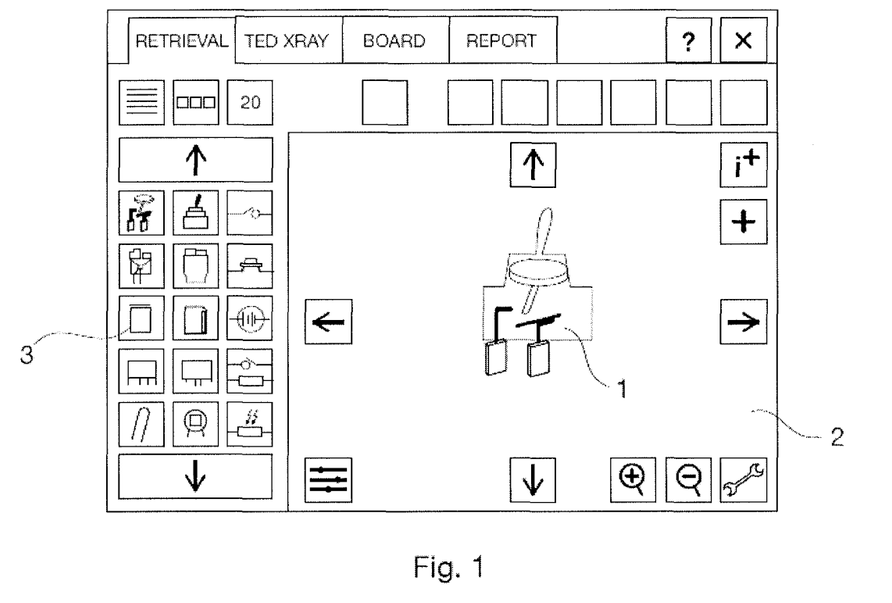
FIG. 1 shows a screen display of the screen of the comparator unit according to one exemplary embodiment of the invention.
Figure 10:
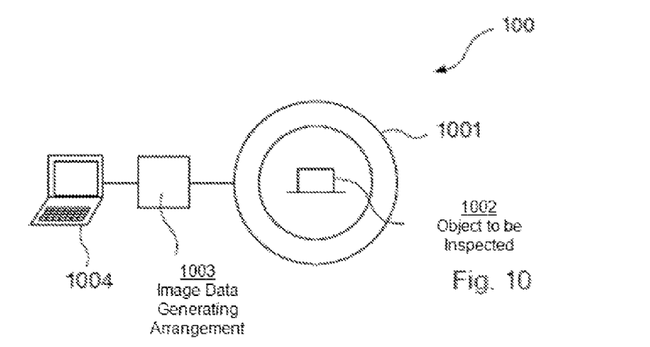
FIG. 10 shows an inspection device according to an exemplary embodiment of the invention.

FIG. 1 shows a diagram of a display screen of the comparator unit 1004 (see FIG. 10).

The inspection device is capable of providing a largely undistorted comparison of a suspicious object (for example, an x-ray image), which is represented as an image, with reference objects from a database for evaluating the actual threat presented by this suspicious object. An interactive digital image and component catalog of reference objects is supplied. These reference objects include, for example, objects that may be found in suspicious and hazardous objects and must be identified. In particular these may be unconventional explosive and/or incendiary devices (so-called IEDs, which stands for "improvised explosive device").

In addition, a virtual circuit can be created to represent and simulate the function of a possible explosive charge after identifying the hazardous object.

Bomb squads thus carry an almost unlimited amount of data with them into the field, and field use of software also saves on weight. Furthermore, through the use of filter functions and through the implementation of a simple operating unit time is gained.

In the field of safety inspections, a substantial amount of time can be saved for the operators of the safety inspection device (for example, x-ray inspection device) in particular when there are doubts as to the contents of a suspect object. Furthermore, security can then be increased significantly because decisions can then be made on the basis of reference objects instead of on the basis of personal assessments.

Moreover, the decision making may be automated or partially automated.

Through the image analysis described above and below for disposal of explosive ordinance and for safety inspections, it is possible for the user to rapidly and easily compare images, for example, x-ray images of suspect and/or hazardous objects, for example, unconventional explosive and incendiary devices.

The system is described below using an x-ray based inspection device as an example. However, the following description of course also applies to the aforementioned alternative inspection devices.

This system is used in proximity to the x-ray monitoring at the work station of the inspector. If there are any uncertainties in the evaluation of the contents of a suspicious object, the inspector will select the corresponding group of reference objects, for example, hair dryers or cell phones, and on the user interface the inspector will select one of the reference products made available (e.g., a touchscreen surface) of one of the system components and will select one of the reference products thereby made available. For selection of the reference product, this product is represented in an enlarged and more precise form. The comparison between the reference product and the image of the suspect product which is thereby made possible allows the user to inspect standard commercial devices for whether they are unaltered and to initiate follow-up measures, if necessary.

If the operator finds a hazardous object or a hazardous substance, the operator can initiate cross-checking and compare the electrical and explosive individual parts according to the so-called "14C IED Component Catalog+Circuit Constructor" to arrive at some certainty about whether the item is hazardous.

The 14C IED Component Catalog+Circuit Constructor is computer software which allows a comparison of the image of the object with reference images and also allows a subsequent creation of a virtual circuit, again followed by an inspection of the circuit thereby created for its functionality.

The so-called 14C IED Component Catalog+Circuit Constructor will be described below.

This computer program product (also referred to as a program element or computer program element and/or a computer program) is suitable in particular for use by police or military bomb squads but of course is also suitable for use in safety inspections.

Before disposing of booby traps (so-called IEDs), bomb disposal engineers for the police and military are often required to collect information about the IED. This requires among other things x-rays to get an impression of the interior and the function of the object. All of the parts recognized on the x-ray image must be identified and correlated with a function. Only after this analysis can a position-oriented decision be made about how to proceed further. Depending on the size of the charge and the type of charge, this may range from disposal by explosive or incendiary means to manual dismantling or even to triggering a disaster alert.

According to one aspect of the invention, the inspection device makes it possible for the user to accurately analyze the x-ray images of an IED. Components may be assigned unambiguously by means of a filter. After visual identification of the components, their functions and the possible applications in an IED are described by the software. The selected parts may be arranged virtually for an understanding of the IED in order to be able to generate a wiring diagram as indicated. Thus, the software is used by bomb squads and security personnel, for example, as an operational tool on computer units 1004 (see FIGS. 10 through 13), e.g., "roughed notebooks" or tablets.

The computer program according to the invention can be operated on conventional operating systems. After the start, there is a logon step, which prevents unauthorized access.

The main page offers as basic functions a display of the catalog and the individual parts contained therein, an import function and display of imported (x-ray) images of suspicious objects/IEDs, such as a whiteboard for generating wiring diagrams, a reporting function (report), a help function and a program termination function.

A corresponding screen display is shown in FIG. 1, for example, where the catalog and a few of the individual parts 3 contained therein are displayed. If a certain individual part (object) is selected, it is displayed as object 1 on the screen sector 2.

Selection of Number 5 or 20:

For example, the catalog may be displayed on the left edge of the screen with five individual parts, each shown separately or as a whole page with 20 individual parts, to be able to make a selection more rapidly. In the display with only five individual parts, most of the screen is filled up by the detailed view in the selection. In the view with 20 individual parts, the screen jumps to the "five-part view" after making a selection in order to display the selection. The "20-part view" must then be selected anew.

Figure 2:
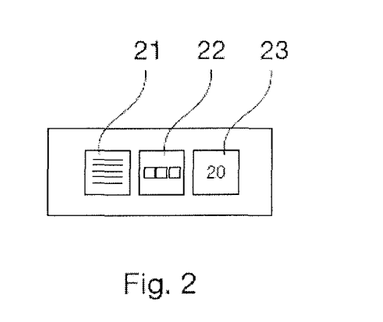
FIG. 2 shows three selection fields for the display of FIG. 1.

FIG. 2 shows corresponding selection buttons 21, 22 and 23 for selecting the various views.

X-Ray View or Mixed View:

All the individual parts displayed in the overview 5 or 20 are represented as images in three views which can be scrolled up or down. The display is, for example, a pure x-ray view with x-ray images from the three directions or a mixed view with an x-ray image as a frontal view, a photograph from a frontal view and corresponding switching signs and symbols.

Figure 3A:
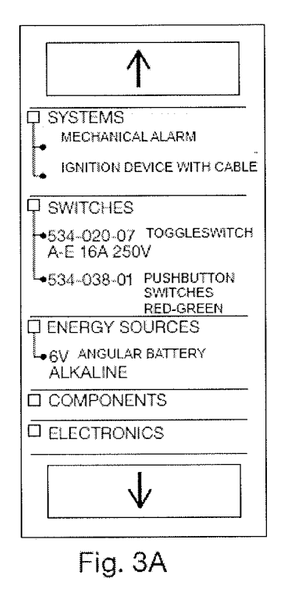
FIG. 3A shows a list of reference objects according to an exemplary embodiment of the invention.
Figure 3B:
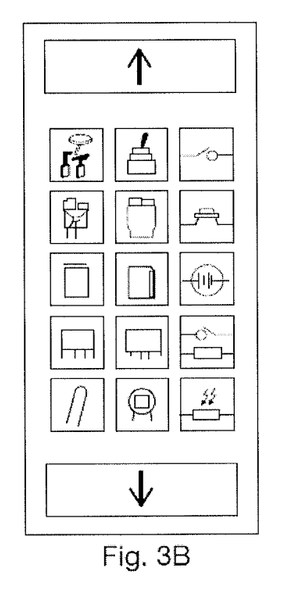
FIG. 3B shows a graphic display of selectable reference objects according to one exemplary embodiment of the invention.

List or Images:

In general, the search can be performed by means of the individual parts which are shown as images (see FIG. 3B) or as a list in which the technical terms of the individual parts are assigned to different groups (see FIG. 3A).

Search Support:

The search for certain individual parts can be supported by multiple functions.

Figure 4:
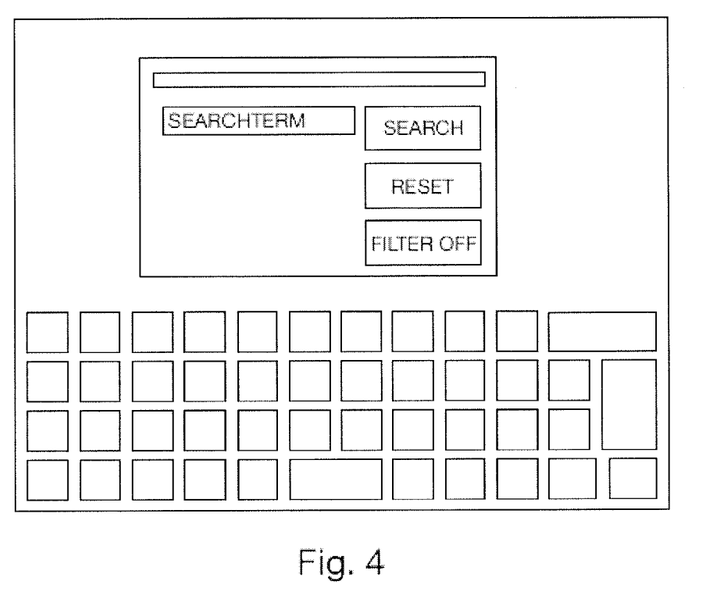
FIG. 4 shows a display for selection of a search function according to one exemplary embodiment of the invention.

For example, a so-called "search button" may be provided. When the search field (search button) is selected, a window for a search term appears automatically and a virtual keypad appears. A search for keywords is conducted throughout the entire database. The search results can be refined subsequently by activation of filter categories. This is illustrated in FIG. 4.

In addition, filter categories may be selected to make it possible to perform a more structured search. The filter categories are not necessarily divided only according to technical and electrotechnical considerations but instead can also be categorized by the operator (explosive and incendiary bomb disposal engineer). For example, light-sensitive resistors may also appear as switches in electronic systems.

It is possible to subdivide these into the following categories:

Ready-to-run and enclosed systems,
Switches,
Energy sources,
Additional components,
Electronic system,
Hazardous substances.

Detailed View:

The respective selected image, x-ray image or symbol from the overview is represented in the detailed view. In general, there is the option in the detailed view of adding the detailed part shown to a selection, retrieving additional information about the functionality and incorporating additional options.

These options, which are represented as function buttons, offer the possibility of displacing the image in various direc tions, enlarging the image and reducing the image or simulating the image quality.

Figure 5:
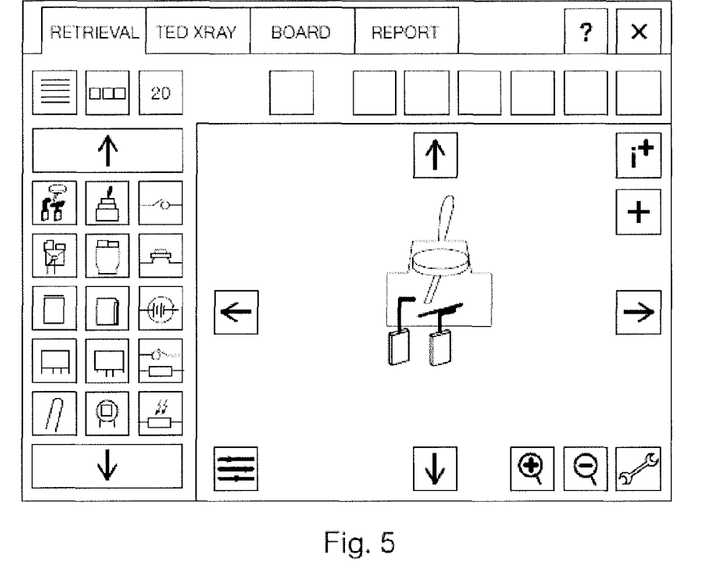
FIG. 5 shows a detailed view of the object according to one exemplary embodiment of the invention.

This is illustrated in FIG. 5.

Comparison:

By selecting the "compare function", the screen is divided and the selected image from the surface "IED x-ray" appears to enable a direct comparison with the IED during the search.

Figure 7:
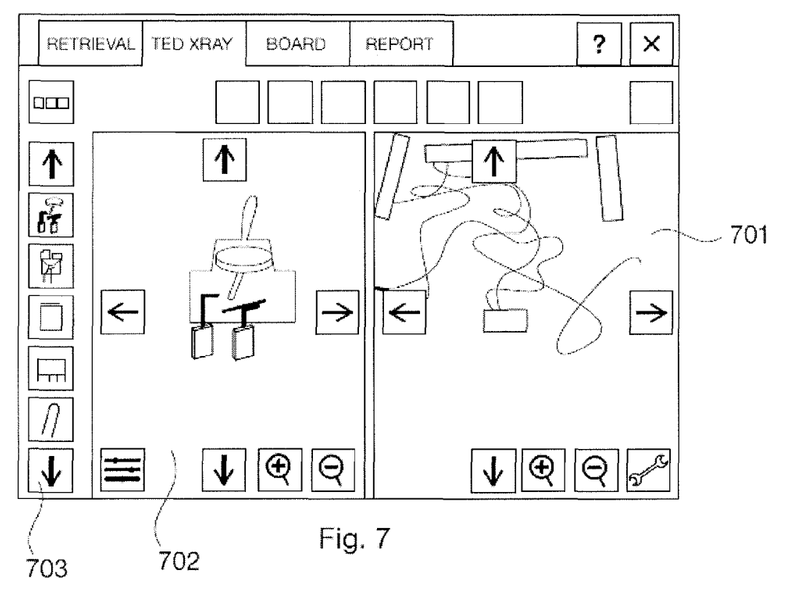
FIG. 7 shows a comparison between an image of the object and an image of a reference object.

This is illustrated in FIG. 7, for example, where the image of the suspicious object is compared with a reference object image 702 on screen detail 701.

Only the import and the illustration of imported images of suspicious objects (for example, x-ray images) are described below.

Import:

Importing images presupposes that the x-ray software used to generate the x-ray image allows images to be exported. The "browse images" field opens a popup window in which the destination of both exported images can be selected. The selected file is received via "import" as a small image in a selection of nine possible IEDs and displayed in the "IED x-ray" field. The selected IEDs can be removed from this selection by selecting "remove."

Figure 6:
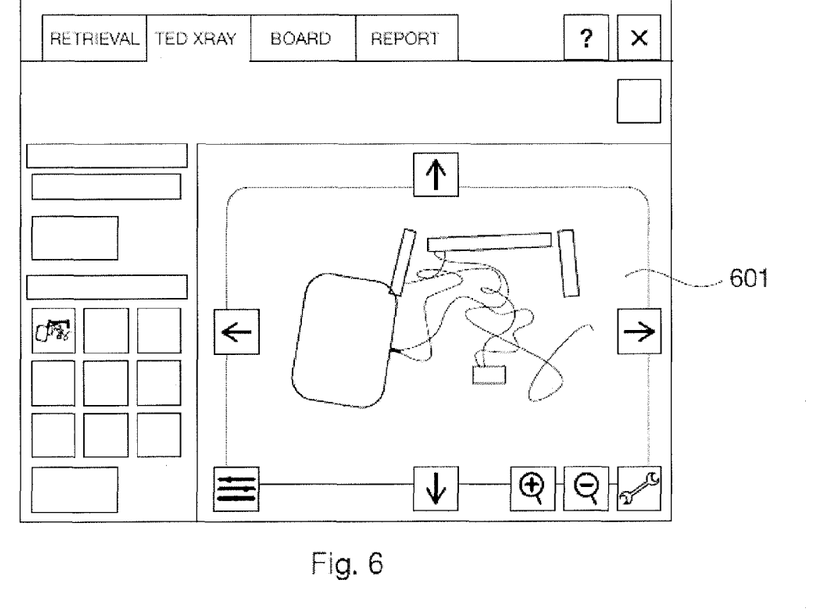
FIG. 6 shows the display of an image of the object according to one exemplary embodiment of the invention.

Display:

Selected images of IEDs are displayed in enlarged form in the large display screen area 601 (see FIG. 6). Again, all the functions of the detailed view are available for viewing. To permit a precise comparison between the individual part and the IED, the screen may be divided by selecting "compare." Then two detailed views appear side-by-side with all functions in a direct comparison. In the "IED x-ray" surface, only the individual parts that are in the process of selection are offered for comparison. These are found in a narrow column at the edges of 703 of the display screen (see FIG. 7) and their view can be adjusted via a selection field.

The creation of a virtual circuit is described in greater detail below.

This function is of assistance in generating a simplified wiring diagram, the 3D assignment of the individual parts with their function within the IED and thus an understanding of how the IED functions.

Figure 8:
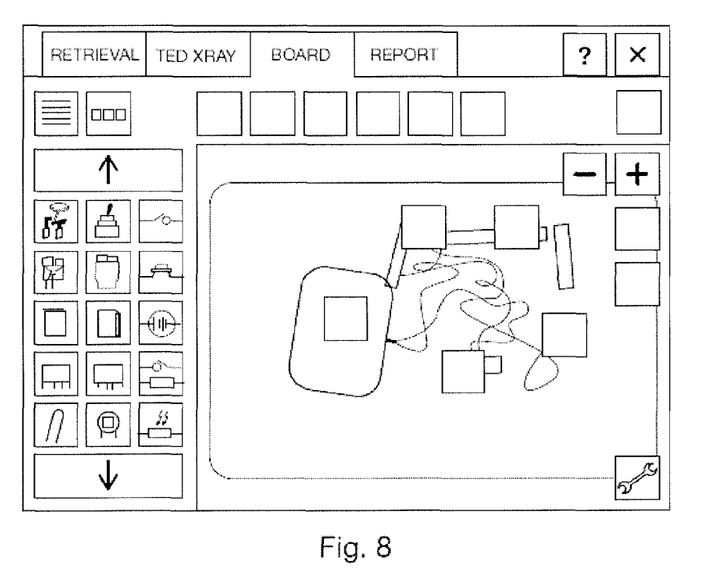
FIG. 8 shows the process of creating a circuit according to an exemplary embodiment of the invention.

Selected Individual Parts:

All the individual parts which are in the selection are displayed in the overview, for example, in the so-called "five-part" overview (see FIG. 8).

Creation of Wiring Diagram:

The allocation of parts is performed either on a blank background ("whiteboard") or on an imported and selected image of an IED x-ray. This is referred to as a whiteboard in both cases.

A single part is selected in the "five part" view and then the place on the whiteboard where the individual part is to be placed is selected. The individual part appears in the selected location and is automatically represented as a symbol. The inserted symbols can be shifted and removed at any time.

To ensure an overview during this allocation, all symbols as well as the IED x-ray may be inserted and removed again by manipulation of buttons.

The symbols may be connected with lines by means of the corresponding button to thereby generate a wiring diagram.

According to a specific exemplary embodiment of the invention, the wiring diagram may be generated in a fully automatic procedure.

Report:

Various findings may be stored and exported for generating a report and/or for archiving a case in a database system.

For example, this may refer to the type of individual parts identified, the wiring diagram generated, the additional information input and/or saving of the complete case.

Help:

After clicking on the help button, any other button may be clicked to obtain information about this. In addition to the corresponding button, a field with auxiliary text may be inserted.

Terminate Program:

After clicking on this field, a safety query is inserted, asking whether the program should in fact be terminated. After confirmation, the program is closed. The prevailing case is frozen and saved automatically.

The computer program may be used for military and police use by bomb squads. In addition, civil use in x-ray monitoring or other baggage or personnel checks in the form of image analysis for disposal of explosive ordinance and for security inspections is also possible. Suspicious objects or objects that have already been identified as harmful can be compared with the help of this program.

Figure 9:
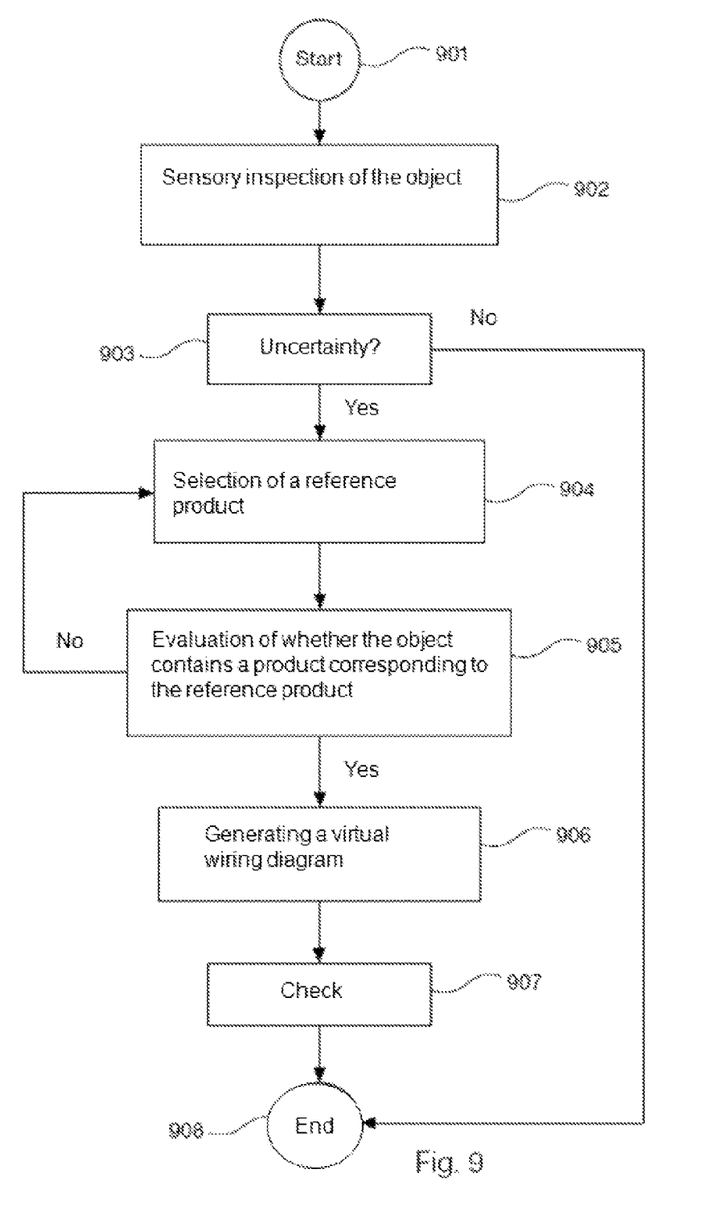
FIG. 9 shows a flow chart of a method according to an exemplary embodiment of the invention.

FIG. 9 shows a flow chart of a method according to an exemplary embodiment of the invention.

This method starts in step 901 and there is a sensory inspection of an object in step 902. The object may be a baggage item, shipped goods, a mail bag or a suspicious object such as an explosive charge, for example.

In step 903, a decision as to whether this object might be a hazardous object is made on the basis of this sensory inspection (imaging). If this is not the case, the inspection method is terminated in step 907.

If, however, the decision is made that in principle this might be a hazardous object, then in step 904 a reference product or reference object is selected from a database and then in step 905 there is an evaluation of whether the object is or contains a product corresponding to the reference product is made on the basis of a visual analysis involving a visual comparison between the reference product and the object that has been classified as hazardous. If this is not the case, another reference product is selected (step 904). If the evaluation in step 905 reveals that the object is a product corresponding to the reference product and/or the object contains such a product, then in step 906 a virtual wiring diagram can be created. This virtual wiring diagram is generated with computer assistance on the basis of the image of the object recorded by the object inspected.

Next in step 907 a check is performed of whether this wiring diagram is functional and in which form this wiring diagram is functional. This can greatly facilitate work for the bomb disposal engineers.

The method ends in step 908.

Figure 11:
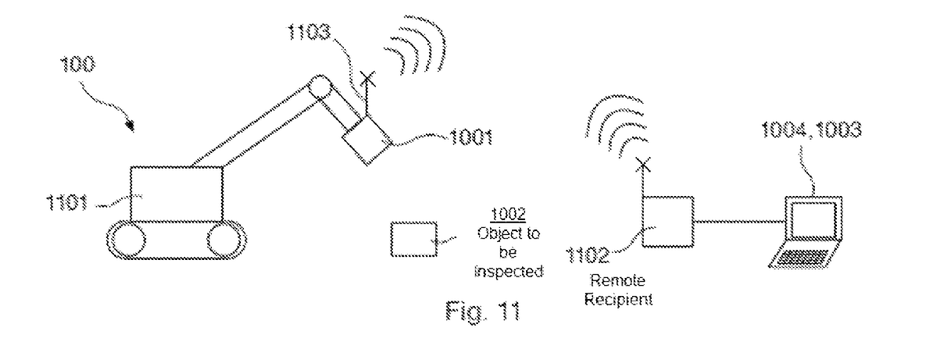
FIG. 11 shows an inspection device according to an additional exemplary embodiment of the invention.
Figure 12:
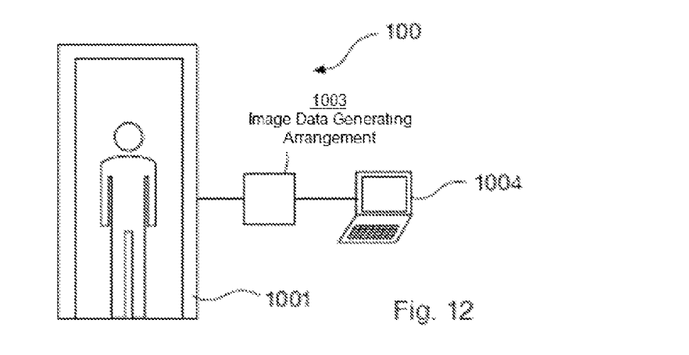
FIG. 12 shows an inspection device according to an additional exemplary embodiment of the invention.

FIGS. 10 through 12 show examples of an inspection device 100. In the case of FIG. 10, this is an x-ray system, for example, a computer tomograph 1001 designed in the form of a ring through which the object 1002 that is to be inspected is inserted. The x-ray system 1001 is connected to the image data generating arrangement 1003, which generates an x-ray image of the object 1002 to be inspected, and this image can then be forwarded to the comparator unit 1004 (which is, for example, a laptop or the like).

FIG. 11 shows an inspection device 100 in the form of a robot 1101, which carries the sensor arrangement 1001. The recorded data of the object 1002 can be sent via the wireless interface 1103 to a remote recipient 1102 which is connected to an image data generating device 1003 and a comparison unit 1004 and transmits the received data to them.

FIG. 12 shows a so-called whole body scanner 1001, which is part of the inspection device.

Figure 13:
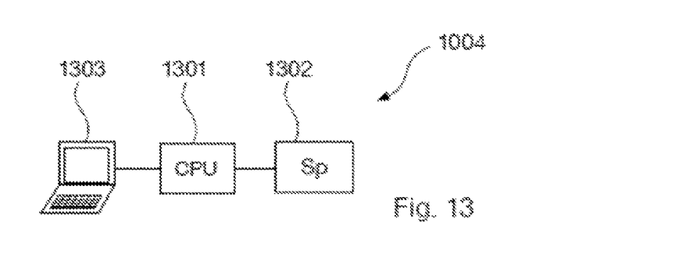
FIG. 13 shows a comparator unit according to one exemplary embodiment of the invention.

FIG. 13 shows an example of a comparator unit 1004, which in this case has a processor 1301 and a memory unit 1302 plus a user interface 1303.

The memory unit 1302 may be the computer-readable medium mentioned above.

The invention relates to the identification of hazardous objects in the field of disposal of explosive ordinance and security inspections. An image of the object is recorded and compared with a stored image of a reference object. The selection of the image of the reference object can be facilitated and accelerated by using certain filter functions. In this way a classification of the object to be inspected can be performed more rapidly and with a high precision.

In addition, it should be pointed out that "comprising" and "having" do not preclude any other elements or steps and the words "a/an" or "one" do not preclude a plurality. Furthermore, it should be pointed out that features or steps described with reference to any one of the above exemplary embodiments may also be used in combination with other features or steps of other exemplary embodiments as described above. Reference numerals in the claims are not to be regarded as a restriction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inspection device for identification of hazardous objects in the field of disposal of explosive ordinance and/or security inspections, said inspection device comprising:
   a sensor and image data generating arrangement configured to inspect an object and to generate an image of the object;
   a comparator unit configured to compare the generated image with known stored reference images,
   wherein the known stored reference images are digital images of reference objects,
   wherein the comparator unit is also configured to automatically, partially automatically or manually create a virtual circuit to represent the function of a possible explosive charge, which is contained in the object, and
   wherein the comparator unit is also configured to automatically check the virtual circuit.

2. The inspection device according to claim 1, wherein the comparator unit is configured to manually adjust a filter function to simplify a selection of a reference image from a data record comprising a plurality of different reference images.

3. The inspection device according to claim 1, wherein the inspection device uses the comparison generated by the comparator unit to identify explosive charges and incendiary materials contained in the object.

4. The inspection device according to claim 1, wherein the sensor arrangement is configured to generate an x-ray image, an ultrasound image, an MR image or a PET image of the object.

5. The inspection device according to claim 1, wherein the inspection device also has a mobile robot unit that carries the sensor and image data generating arrangement.

6. The inspection device according to claim 1, wherein the inspection device is a security inspection device for baggage items, freight or postal shipments.

7. The inspection device according to claim 1, wherein the inspection device is a personal inspection device in the form of a whole body scanner device.

8. The inspection device according to claim 1, wherein the inspection device is configured to automatically perform the comparison and to classify the object on the basis of the comparison.

9. A method for identification of hazardous objects in the field of disposal of explosive ordinance and/or security inspections, this method comprising the following steps:
   inspecting, by a sensor, an object;
   generating, by an image data generating arrangement, an image of the object;
   selecting a reference image from a plurality of reference images;
   comparing, by a comparator unit, the selected reference image with the generated image of the object; and
   generating a virtual circuit representing a function of a possible explosive charge, which is contained in the object,
   wherein the plurality of reference images are digital images of reference objects.

10. The method according to claim 9, further comprising the step:
    automatically inspecting the virtual circuit.

11. A program element stored on a non-transitory computer readable medium, which, when executed on a processor of an inspection device, instructs the inspection device to:
    inspect an object using a sensor;
    generate an image of the object using an image data generating arrangement;
    select a reference image from a plurality of reference images;
    compare the selected reference image with the generated image of the object using a comparator unit; and
    generate a virtual circuit representing a function of a possible explosive charge, which is contained in the object,
    wherein the plurality of reference images are digital images of reference objects.

12. The program element stored on a non-transitory computer readable medium according to claim 11, which, when executed on a processor of an inspection device, further instructs the inspection device to:
    automatically inspect the virtual circuit.

* * * * *